Figure 1:
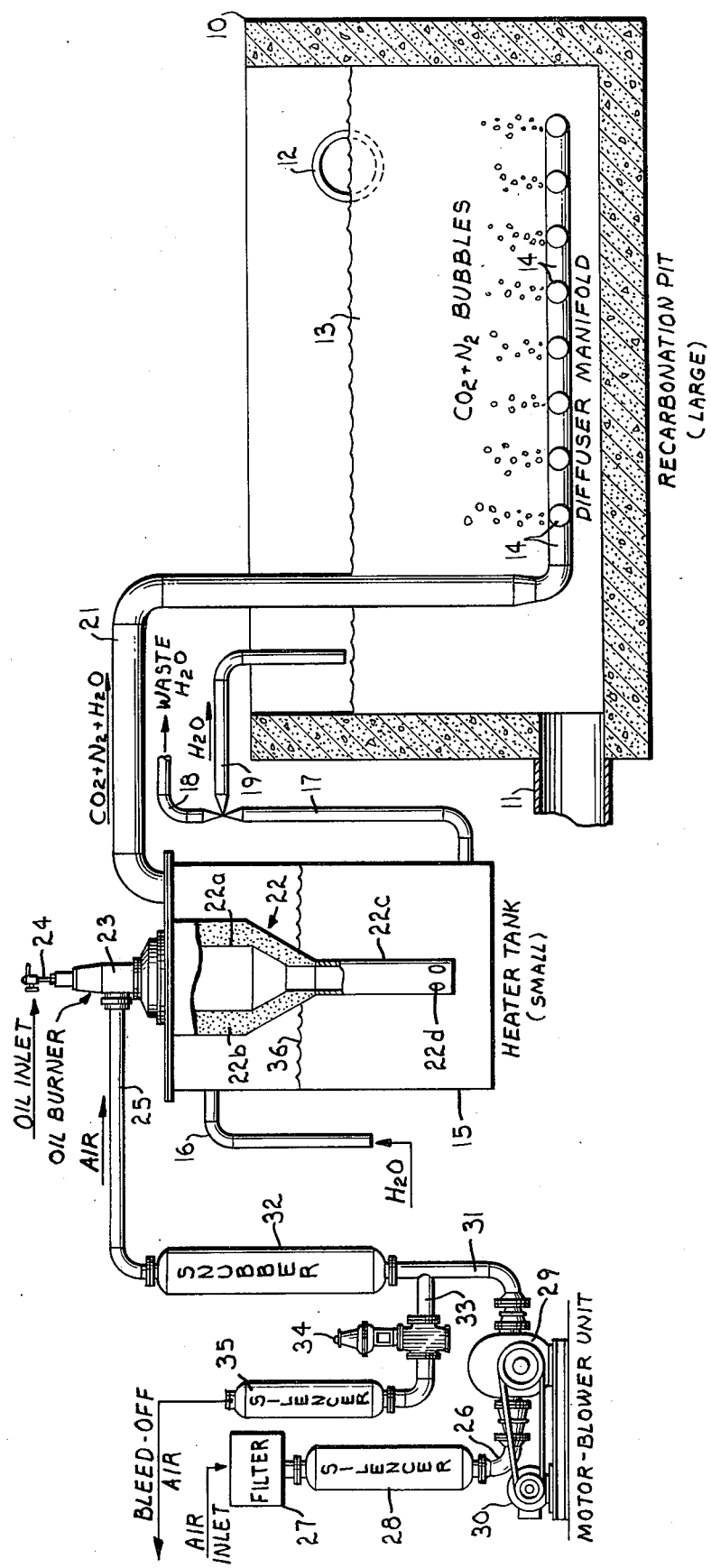

United States Patent

Douglas

[11] 3,976,445
[45] Aug. 24, 1976

[54] RECARBONATION PROCESS AND APPARATUS

[75] Inventor: Clarence J. Douglas, Tulsa, Okla.

[73] Assignee: Ozark-Mahoning Company, Tulsa, Okla.

[22] Filed: May 23, 1974

[21] Appl. No.: 473,148

[52] U.S. Cl. .................................. 55/68; 55/256; 137/12.5; 261/124; 261/DIG. 7
[51] Int. Cl.$^2$ .................................. B01D 47/02
[58] Field of Search ................... 210/59, 60, 70, 71, 210/72, 150, 151–169, 198; 159/16 A; 137/1, 12.5; 261/17, 121, 124; 55/255, 256, 68

[56] References Cited
UNITED STATES PATENTS

| | | | |
|---|---|---|---|
| 3,412,741 | 11/1972 | Mills | 261/17 |
| 3,428,559 | 2/1969 | McInnis | 210/169 |
| 3,595,783 | 7/1971 | Pflanz et al. | 210/151 |
| 3,654,149 | 4/1972 | Hedgpeth | 210/169 |
| 3,756,220 | 9/1973 | Tehrani et al. | 210/169 |
| 3,812,793 | 5/1974 | Solomon | 261/17 |
| 3,835,909 | 9/1974 | Douglas et al. | 159/16 A |

Primary Examiner—Theodore A. Granger

[57] ABSTRACT

Improvements in methods of and apparatus for recarbonation of lime-treated water with an oil fired submerged combustion burner; establishing a smaller reservoir adjacent a larger primary recarbonation reservoir with the oil fired burner in the former, passing the combustion products out of the smaller reservoir water into the primary reservoir water to recarbonate the latter, flowing water through the smaller reservoir in quantities to cool the burner and remain below boiling point, and passing the smaller reservoir water to one of:

1. waste or a sewer; or
2. the larger reservoir; or
3. part to each of (1) and (2);

apparatus for carrying out such improved recarbonation process.

6 Claims, 1 Drawing Figure

RECARBONATION PROCESS AND APPARATUS

BRIEF DESCRIPTION OF INVENTION

In municipal water treatment plants and waste water reclamation plants, the addition of sufficient lime to the water raises the pH and converts bicarbonates and carbonates to hydroxides, incidental to the main purpose of treatment which are coagulation of non-settleable matter and removal of phosphorous. Recarbonation is a term applied to the addition of carbon dioxide to a lime-treated water. When carbon dioxide is added to high pH, lime-treated water, the pH is lowered and the hydroxides are converted to carbonates and bicarbonates. Recarbonation thus describes the result of adding carbon dioxide to waste water. The basic purpose of recarbonation is downward adjustment of the pH of the water. Properly done, this places the water in calcium carbonate equilibrium, and avoids problems of deposition of calcium scale which would occur without the reduction in pH accomplished by recarbonation.

U.S. Pat. No. 2,182,286, issued Dec. 5, 1939, "Method of Treating Water Supplies" to Doennecke et al teaches carbonation of large bodies of water by generation and liberation of hot products derived from combustion of a suitable gas in a burner submerged beneath the surface of a stream of the water to be carbonated. Doennecke et al submerges the burner to a suitable depth in the water stream and proportions the volume of the water stream so that all or substantially all the water will pass through the sphere of influence of the products of combustion as they are discharged from the burner, thereby insuring thorough permeation of the water by the CO2 when the burner is operating at its maximum or any lesser capacity.

Typical submerged combustion burners usable for such purposes may be seen in Doennecke et al. U.S. Pat. No. 2,159,759 issued May 23, 1939 for "Apparatus..." U.S. Pat. No. 2,418,162, issued Apr. 1, 1947 "Apparatus and Method for Producing Inert Gas", Cecil et al; Young et al U.S. Pat. No. 2,723,659 "Submersible Burner" issued Nov. 15, 1955 and C. J. Douglas et al, Ser. No. 253,541, filed May 15, 1972 for "Methods and Apparatus for Submerged Combustion (With Air Pollution Control)"-issued Sept. 17, 1974 as U.S. Pat. No. 3,835,909.

Carbon dioxide absorption systems often consist of a grid of perforated pipe submerged in the waste water being treated. The recommended minimum depth of submergence is 8 feet. With lesser depth of submergence, some undissolved carbon dioxide will escape at the water surface. Properly designed absorption systems will put into solution 85% to 100% of the applied carbon dioxide.

The known prior art with respect to recarbonation processes, systems and apparatus is well represented in the treatises of:

1. "Advanced Waste Water Treatment", authors Russell L. Culp et al, Van Nostrand Reinhold Company, New York, 1971; and
2. "Hoover's Water Supply and Treatment" (Tenth Eddition), Merrill L. Riehl, Bulletin 211, Published by National Lime Association, Washington, D. C. 20016.

Because of the shortage in many localities of natural gas, hydrocarbon fuel oil fired burners are often used in submerged combustion recarbonation processes. Dual purpose burners, which may alternately use air-gas and air-fuel oil mixtures for submerged combustion recarbonation are often provided. In such hydrocarbon fuel oil fired burners, the oil goes to gaseous form in the combustion process. That is, such is either an easily vaporizable oil or is mechanically atomized in the combustion air.

In start-up of such an oil fired submerged combustion burner, if the burner does not fire, there will be a marked oil taint in the water surrounding the burner. This is very undesirable and gives a strong taste sensation in drinking water which is being recarbonated. Further, in the event of a power or oil failure to such a burner, then oil tainting could take place either during the running of the burner or in subsequent start-up thereof (or both). It is also possible, with hydrocarbon oil fired burners to find phenols, aldehydes and formaldehydes in emissions therefrom which are objectionable.

OBJECTS OF THE INVENTION

An object of the instant invention is to provide improved methods of and apparatus for recarbonation of water supplies utilizing a submerged combustion burner fueled by hydrocarbon fuel oil wherein the problem of hydrocarbon fuel contamination of said water to be recarbonated exists.

Another object of the invention is to provide simple and relatively inexpensive apparatus for recarbonation of water supplies utilizing a submerged combustion burner fueled by hydrocarbon fuel oil, wherein the burner is operated in a separate heater tank in such manner that only the combustion gases for recarbonation are passed from the separate heater tank into the main recarbonation reservoir or vessel when there is any possibility of fuel oil contamination of the water in the burner tank.

Another object of the invention is to provide improved submerged combustion apparatus for recarbonation wherein a separate heater tank contains the hydrocarbon fuel oil fired burner with the water in said separate heater tank so regulated as to quantity and flow that, first, there is no steam carryover of hydrocarbons from the heater tank to the main recarbonation reservoir and, further, the effluent water from the heater tank is passed to waste whenever there is any substantial possibility or probability of hydrocarbon fuel oil contamination.

Another object of the invention is to provide an improved process for recarbonation of water supplies employing a hydrocarbon fuel oil fired submerged combustion burner, the process involving the isolated and separate operation of said submerged combustion burner(s) is one or more separate heater tanks under such conditions that no hydrocarbon fuel oil contamination is carried into the main recarbonation vessel either by steam carryover or cooling water effluent from said separate heater tank(s).

Yet another object of the invention is to provide improved methods of and apparatus for oil fired recarbonation burner systems wherein any possibility of oil contamination of the water being recarbonated, either on start up or during running of the submerged combustion burner, is avoided, yet full efficiency in recarbonation is provided.

Other and further objects of the invention will appear in the course of the following description thereof.

The single sheet of drawings shows, schematically, the improved apparatus and process system for recarbonating water supplies utilizing an hydrocarbon fuel oil fired submerged combustion burner.

APPARATUS AND PROCESS

Referring to the drawing, at 10 is seen a recarbonation pit or reservoir of conventional design having a water inlet line 11 typically in the lower portion thereof and a water outlet line 12 in the upper portion thereof defining the water level of a body of liquid water 13. A grid of perforated pipes 14 comprising a diffuser manifold to pass carbon dioxide into the water body 13 to recarbonate same is provided. This grid is typically submerged at least 8 feet below the surface of water body 13.

This main recarbonation water reservoir is operated in conventional manner in that the quantity of water passed through the reservoir from inlet 11 to outlet 12 is treated with sufficient carbon dioxide to effect the desired change of caustic alkalinity and carbonate alkalinity to bicarbonates. It is well known that, although about 90% of the applied $CO_2$ does enter the water as dissolved $CO_2$ in its short upward journey from the distribution grid through 8 feet of water to the water surface, the time for complete reaction between the dissolved $CO_2$ and hydroxide and carbonate ions may be as great as 15 minutes in cold water. In such case, it is desirable to allow not only for reaction time (15 minutes) but for enough time to provide some separation of the calcium carbonate by settling.

The prior art comprising the above patents and literature references recognize submerged combustiion of natural gas as a known method for carbon dioxide generation. Air and natural gas are burned, conventionally under water at the point of application, specifically, that is, in the recarbonation basin. Said otherwise, a mixture of gas and air, in proper proportion, is forced to the burners by air compressors. The gas is ignited and burns beneath the surface of the water in the recarbonation reservoir or pit.

In the instant process and improvement, a much smaller water reservoir is established in a second, relatively smaller and enclosed vessel or heater tank 15. New water is supplied to tank 15 through line 16 and water is withdrawn therefrom via line 17. Line 17, after exiting tank 15 divides into line 18 to waste and line 19 passing to large recarbonation water reservoir 10. A value at the junction of lines 17, 18 and 19 controls the effluent water flow from tank 15 in three options:
1. all of the water to waste through line 18; or
2. all of the water to reservoir 10 through line 19; or
3. metered flow part into line 18 to waste and part into line 19 to reservoir 10.

The enclosing top or lid of tank 15 is penetrated for two purposes. First there is provided overhead gas conduit 21 which carries carbon dioxide, nitrogen and water vapor to reservoir 10 and below the surface of the liquid body 13 thereof for distribution as recarbonation gas through diffuser manifold 14. Secondly, a conventional oil fired submerged combustion burner generally designated 22 is mounted in and passing through top 15a of tank 15. Schematically illustrated, this is of conventional type having a combustion chamber 22a surrounded by a refractory body 22b. The products of combustion pass downwardly from combustion chamber 22a into conventional cylindrical duct or dip pipe 22c having openings 22d adjacent the lower end thereof. Burner 23 proper has valve controlled oil inlet line 24 and air input conduit 25.

FIGS. 8 and 9 of Douglas et al Ser. No. 253,541, supra, filed May 15, 1972, issued Sept. 17, 1974 as U.S. Pat. No. 3,835,909 for "Methods and Apparatus for Submerged Combustion (with Air Pollution Control)", shown an alternative and optimum form of oil fired submerged combustion burner particularly adapted for the instant use.

With respect to the source of air for conduit 25 connecting with burner 23, any suitable source of compressed air may be employed, there being illustrated a typical compressor unit. Air inlet line 26 typically carries inlet filter 27 and silencer 28, passing to centrifugal blower 29 powered by electric motor 30. Compressed air is discharged through output conduit or line 31, passing through snubber 32 (to smooth the pulsing flow of air from the blower 29) into burner air supply line 25. Depending on burner air demand, bleed-off air is taken via line 33, controlled by back pressure valve 34, through silencer 35 to atmosphere.

In the oil burner, air and fuel are introduced and mixed into the desired ratio, discharging into the combustion chamber. The combustion chamber is the area in which the combustion process takes place. This is defined in the conventional burner shown by those passages surrounded by refractory 22b. The combustion chamber may be refractory lined as shown or under certain circumstances it may be of metal construction, depending upon the temperatures of the combustion gases, the amount of cooling to which the chamber is exposed, etc.. The chief purpose of dip pipe 22c is to discharge the hot gases beneath the surface of the liquid.

The burner, in heater tank 15, is operated in a body of water which at least completely submerges dip pipe 22c and, preferably, a proportion or portion of the refractory 22b as indicated by level 36.

Sufficient water must be maintained in heater tank 15 and passed therethrough, continuously, to accomplish two major purposes:
1. to maintain the entire body of liquid in heater tank 15 below boiling point so that no steam goes over through line 21; and
2. to maintain a sufficient level in the tank in order to maintain at least the dip pipe 22c submerged and carry away the heat from the burner (keep the dip pipe from being overheated or burned out).

The quantity of heat input by the burner and the quantity of water run through tank 15 is so regulated that the entire liquid body is maintained below the boiling point of water in order that no steam carryover takes place (because some fraction of hydrocarbon contamination (if any) might be carried over, resulting in tainting of the water in reservoir 10). Further, the solubility of carbon dioxide in the water is not too great and it is less soluble as the temperature increases. If steam is being generated in tank 15, carbonic acid might be formed which would corrode the main overflow pipe. Still further, the hotter the system in tank 15, the more water which may necessarily have to be passed to waste via line 18 to avoid contamination in reservoir 10.

Optimally, enough water would be passed through tank 15 to keep the temperature therein at not more than 160°F. One reason for this is that the solubility of $CO_2$ at 160°F is less than it is at 60°F. Further, it requires less water through tank 15 at this temperature than if enough water was circulated to keep the temperature at, say, 100°F. In any case, it is desired to keep tank 15 below boiling point for fear of distillation of some fractions of any oil resident in the tank, which would cause it to accompany the $CO_2$ and $N_2$ into the larger recarbonation basin and condense there.

The amount of water going to tank 15 is minimal. The following calculations, based on a one million gallon volume indicates the relative quantity of such water to tank 15:

$CO_2$ required in lbs./million gallons of water recarbonated=250

Natural gas required in C F = 2160
1000 BTU/cu.ft. natural gas
$2160 \times 1000 = 2,160,000$ BTU
$1,000,000 \times 8.34 = 8,340,000$ lbs. water
Then $= 2,160,000$ lbs./$8,340,000$ lbs. $= 0.259°F$ rise for 1 MG flow Then if one raises the water in the small heater tank from 60°F to 160°F it would represent a 100°F rise.

Then $(x) \times 100 = 2,160,000$ BTU
$2,160,000/100 = 21,600$ lbs. water to keep small tank at 160°F
$21,600$ lbs./$8,340,000$ lbs. $= 0.0026 \times 100 = 0.26\%$ of water through small tank From the above, it is apparent that unless the temperature rise changes, on the above basis, there would never be over 0.25% of 1.0% of the total water in the system flowing through heater tank 15.

It should be understood that a plurality of submerged combustion burners could be provided in tank 15 or a plurality of tanks 15 each with a separate or a plurality of burners therewithin with respect to any given recarbonation reservoir 10.

Under some conditions all of the water withdrawn from tank 15 will be passed to waste or, as an alternative, to a boiler, but in neither case to the reservoir 10. Alternatively, during start-up of the burner and for a time thereafter, all the water may be passed through line 18 to waste or boiler and, thereafter, via valve 20, the water effluent from tank 15 may be passed through line 19 into reservoir 10. Yet further alternatively, at any time in the operation of the burner in tank 15 to recarbonate the water in reservoir 10, a portion of the water effluent through line 17 may be simultaneously passed into reservoir 10 and to waste or to a boiler through line 18.

My process comprises recarbonating water using a submerged combustion burner fueled by hydrocarbon oil having the steps of:

1. establishing a main recarbonation reservoir in a first relatively larger vessel;
2. establishing a submerged burner containing water reservoir in a second relatively smaller enclosed vessel;
3. effecting combustion of hydrocarbon fuel oil in the said second vessel in a submerged combustion burner and discharging the products of combustion beneath the surface of and into the water therewithin;
4. replenishing the water of said second reservoir in such quantity as to maintain a desired level therewithin and also maintain the temperature of the water body in said second reservoir below the boiling point during combustion in said second reservoir;
5. continuously collecting the products of combustion in said second reservoir and passing same into and below the surface of the water in the first vessel thereby to recarbonate same;
6. removing excess water from the second vessel; and
7. circulating water to be carbonated to the first vessel.

From the foregoing, it will be seen that this invention is one well adapted to attain all of the ends and objects hereinabove set forth together with other advantages which are obvious and which are inherent to the process.

It will be understood that certain process features, steps and sub-combinations thereof are of utility and may be employed without reference to other features, steps and process subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

I claim:

1. A process of recarbonating water using combustion products from which unburned hydrocarbon fuel has been removed, said process comprising the steps of:
   a. providing a water reservoir having inlet means for admitting water to be treated and outlet means for discharging treated water therefrom,
   b. providing a gas diffuser manifold submerged in said reservoir,
   c. arranging a combustion burner fueled by hydrocarbon oil adjacent said reservoir, said burner being disposed within an enclosed vessel,
   d. providing liquid in the lower portion of said vessel whereby combustion products at said burner are discharged into said liquid,
   e. providing gas conduit means in fluid communication with the upper portion of said vessel and the gas diffuser manifold adjacent the bottom of said reservoir,
   f. introducing water to be recarbonated into said reservoir,
   g. operating said burner to discharge its combustion products including any unburned hydrocarbon fuels beneath the level of the liquid in which the burner is located, and
   h. collecting the products of combustion in said vessel escaping from the surface of said liquid and passing same through said gas conduit means and said gas diffuser manifold to said reservoir,
   i. whereby combustion gasses, from which said unburned hydrocarbon fuels have been separated, recarbonate the water in said reservoir.

2. A process as in claim 1 including the steps of providing additional liquid to said vessel and removing excess liquid above a predetermined level at a rate which maintains such liquid at a predetermined temperature below its boiling point.

3. A process as in claim 2 including passing excess liquid free of unburned hydrocarbon fuels to said reservoir.

4. Apparatus for recarbonation of water utilizing a submerged combustion burner fueled by hydrocarbon oil, said apparatus comprising in combination:
   a. a main water reservoir having inlet means for water to be treated and outlet means for treated water,
   b. a gas diffuser manifold submerged in said reservoir,
   c. a submerged combustion burner adjacent said reservoir and including an enclosed vessel having a hydrocarbon oil burner located therein, with liquid in a lower portion of said vessel, being constructed and arranged whereby the products of combustion of said burner are discharged into said liquid and then pass from said liquid to the upper portion of said vessel, and d. gas conduit means in communication with an upper portion of said vessel, for passing the products of combustion from said vessel through said gas diffuser manifold to said reservoir whereby water in said reservoir is recarbonated by gasses from said burner products of combustion which have been discharged under said liquid to remove unburned hydrocarbon fuel therefrom.

5. Apparatus according to claim 4 further including an inlet and an outlet for said vessel for respectively admitting additiional liquid and discharging excess liquid with respect to a predetermined liquid level, whereby the temperature of said liquid in said vessel may be maintained within a predetermined temperature range by the amount of additional liquid admitted and excess liquid discharged.

6. Apparatus according to claim 5 further including liquid conduit means for the optional discharge of excess liquid to said reservoir when said excess liquid is free of unburned hydrocarbon oil.

* * * * *